Nov. 8, 1960  R. W. GREGORY ET AL  2,959,007
JET ENGINE IGNITION SYSTEM UTILIZING PYROPHORIC FUEL
Filed Feb. 13, 1957  3 Sheets-Sheet 3
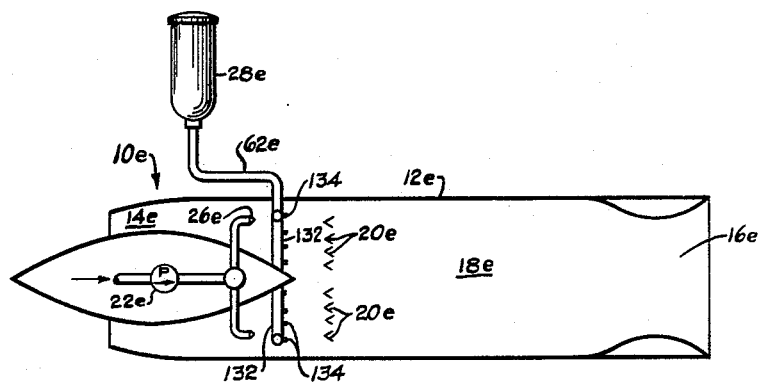
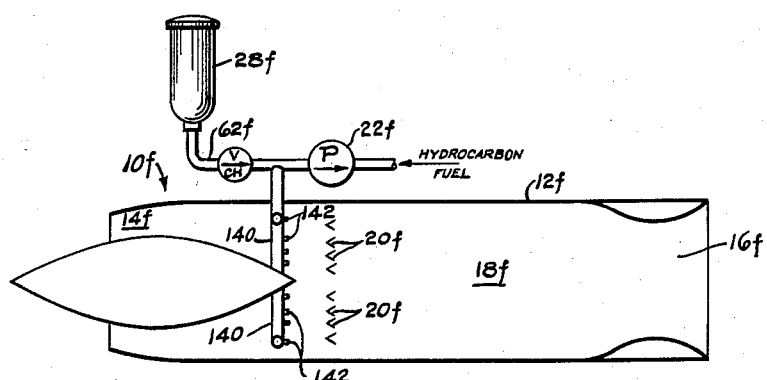
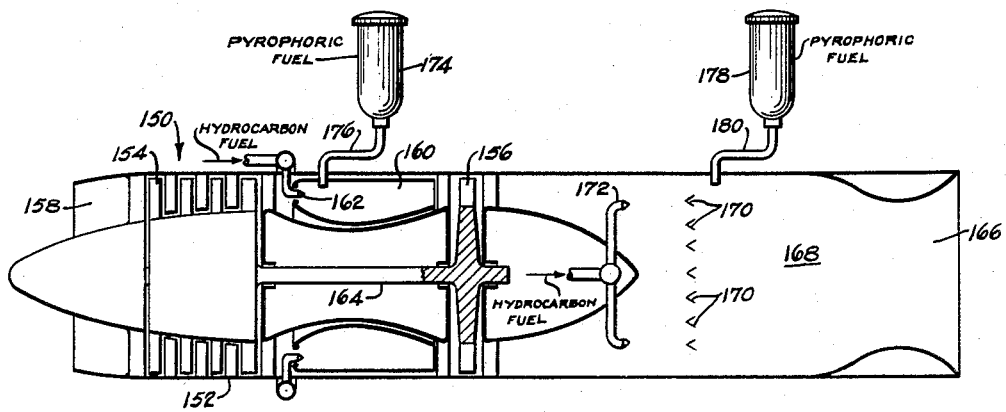
INVENTORS
RUSSELL W. GREGORY
EMIL D. KALIL
BY
ATTORNEY

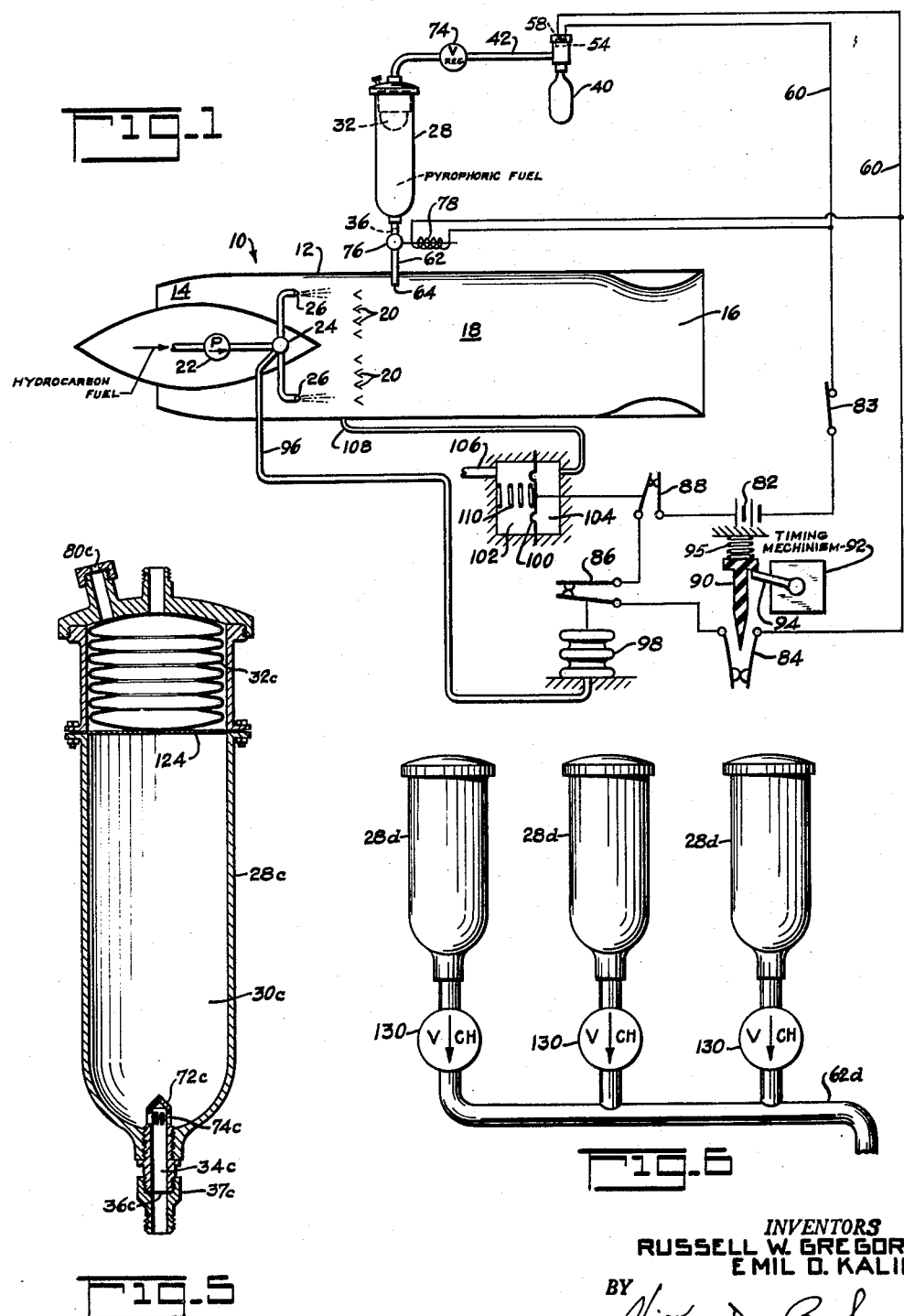

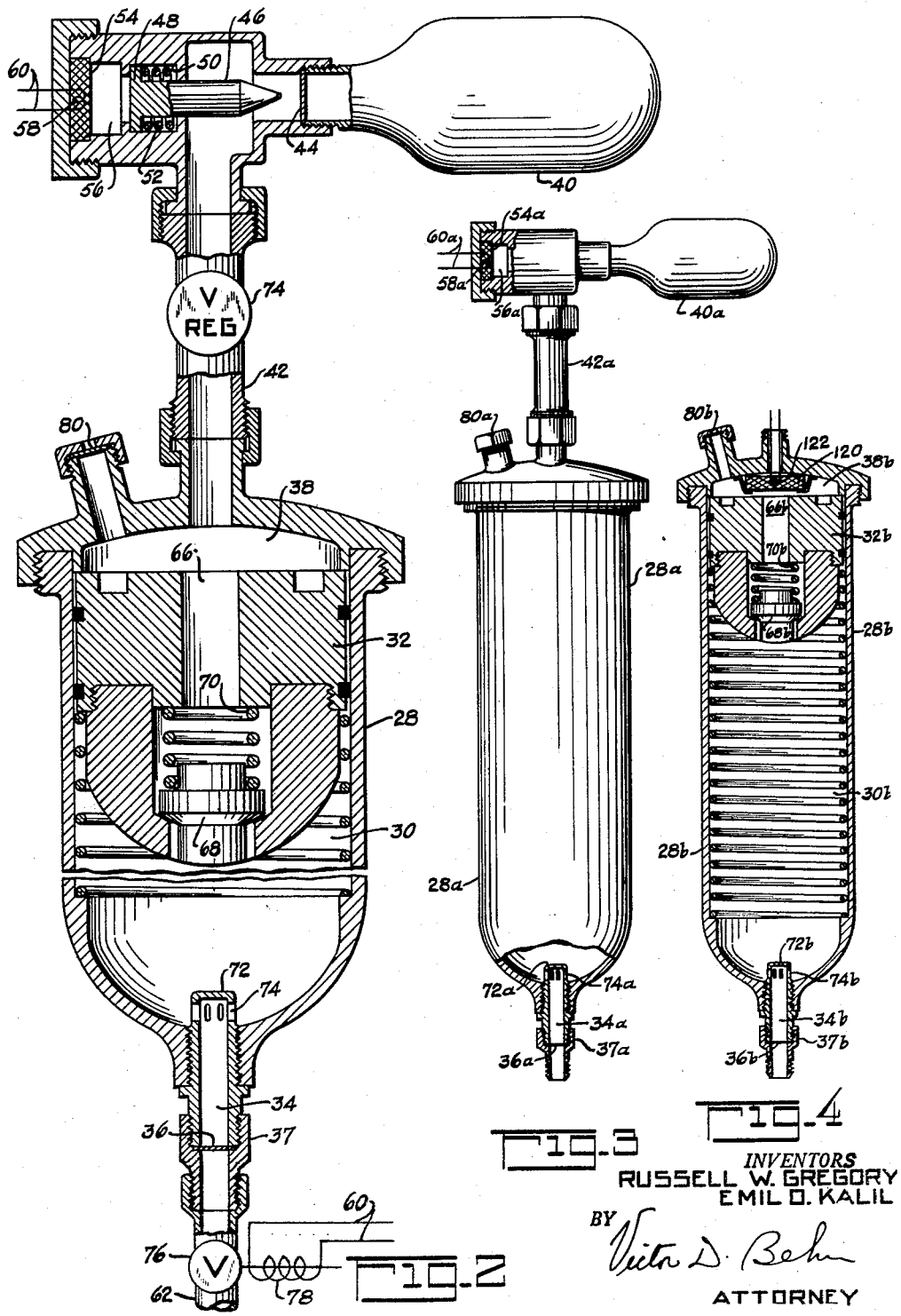

2,959,007
JET ENGINE IGNITION SYSTEM UTILIZING PYROPHORIC FUEL

Russell W. Gregory, Allendale, N.J., and Emil O. Kalil, Brooklyn, N.Y., assignors to Curtiss-Wright Corporation, a corporation of Delaware Filed Feb. 13, 1957, Ser. No. 639,953

1 Claim. (Cl. 60—39.82)

This invention relates to ignition of jet engines and is particularly directed to the use of pyrophoric fuels for igniting jet engines.

Primarily because of the high speed flow of the combustible fluid through a jet engine initial ignition of said fluid is relatively difficult. In addition subsequent re-ignition of the combustible fluid, necessitated because of flame blow-outs, is likewise difficult.

An object of the present invention comprises the provision of novel ignition system for air-breathing type jet engines. A further object of the invention comprises the provision of such an ignition system which not only is of simple construction but is instantaneously operative at all operating altitudes of air-breathing jet engines and which is unaffected by the type of main fuel used by the engine. Specifically the invention is directed to the use of pyrophoric fuels for igniting the main combustible mixture of an air breathing jet engine.

Other objects of the invention will become apparent upon reading the annexed detailed description in connection with the drawing in which:

Fig. 1 is a diagrammatic view of a ram jet engine embodying the invention;

Fig. 2 is an enlarged view of a portion of Fig. 1;

Figs. 3, 4 and 5 are views similar to Fig. 2 on a reduced scale and illustrating modifications;

Fig. 6 is a view of a further modification;

Figs. 7 and 8 correspond to a portion of Fig. 1 and illustrate further modifications of the invention; and Fig. 9 illustrates the invention applied to a turbojet engine.

As herein used a "pyrophoric fuel" is one which ignites spontaneously on contact with air at room temperatures or lower. The invention contemplates the use of liquid pyrophoric fuels. Aluminum trimethyl and aluminum triethyl are examples of suitable such fuels. Other examples are boron triethyl, aluminum tripropyl silane, and aluminum borohydride. For the purpose of this invention a mixture of seventy-five percent aluminum trimethyl and twenty-five percent aluminum triethyl is preferred.

Referring first to Figs. 1 and 2 of the drawing, a ramjet engine is schematically designated by reference numeral 10. As shown the engine 10 comprises a duct-like housing 12 having a forwardly directed air inlet 14, a rearwardly directed exhaust nozzle 16 and a combustion chamber 18 therebetween having flame-holder means indicated at 20. The main ramjet fuel is a conventional hydrocarbon fuel and is supplied by a pump 22 to a manifold 24 for discharge from the nozzles 26 into the air stream entering the inlet 14. This air and fuel mix to form a main combustible mixture which flows over the flameholder structure 20 into the combustion chamber 18.

In order to ignite the main combustible mixture at the flameholder structure 20 means are provided for discharging a slug or charge of pyrophoric fuel into the combustion chamber 18 at said flameholder structure. For this purpose there is provided a container or cylinder 28 holding a liquid supply of pyrophoric fuel, said fuel filling the space 30 between the movable wall portion or piston 32 within the cylinder and the cylinder outlet 34. The details of the pyrophoric fuel cylinder 28 and the pumping or ejecting mechanism for causing said pyrophoric fuel to discharge from said cylinder are best seen in Fig. 2. Because the pyrophoric fuel ignites spontaneously on contact with air it is essential that air be excluded from contact with the pyrophoric fuel until burning of said fuel is desired.

The space 30 for the pyrophoric fuel is a closed space formed by the walls of the cylinder 28, the movable piston 32 within said cylinder and a sealing diaphragm 36 disposed in an outlet fitting 37 at the cylinder outlet 34. The diaphragm 36 is rupturable as hereinafter described. The other or head end 38 of the cylinder 28 is connected to sealed container 40 by a conduit 42, an inert gas, such as nitrogen, being sealed under pressure in the container 40. The discharge end of the high pressure nitrogen container or bottle 40 is sealed by a rupturable diaphragm 44. A pointed pin member 46 is provided for breaking the diaphragm 44. The end of the pin member 46 remote from the diaphragm 44 has a head or piston portion 48 slidable in a cylindrical bore 50 and urged away from the diaphragm 44 by a spring 52. A small charge 54 of gun powder or similar explosive is mounted in a closed chamber 56 behind the piston 48 and an igniter 58 is connected to electric circuit for exploding the charge 54. The igniter 58 may be in the form of an electric wire filament which becomes incandescent upon the passage of electric current therethrough.

With the aforedescribed structure when the charge 54 is exploded, the pin 46 is driven into the diaphragm 44 thereby breaking said diaphragm. This releases the high pressure gas from the container 40 whereupon the conduit 42 supplies this high pressure gas to the cylinder head end 38 so that said gas now acts against the piston 32. The gas pressure against the piston 32 is transmitted through the liquid pyrophoric fuel to the rupturable diaphragm 36, said pressure being sufficient to break the diaphragm 36. When the diaphragm 36 breaks, the gas pressure on the piston 32 moves the piston to cause pyrophoric fuel to discharge from the cylinder outlet 34 through the outlet conduit 62. The conduit 62 terminates in a discharge end 64 at the flameholder structure 20 so that pyrophoric fuel is discharged at said flameholder structure. The pyrophoric fuel immediately ignites upon contact with the oxygen in the air flowing into the engine combustion chamber from the inlet 14. Under all operating conditions of the engine and regardless of the type of main fuel used by the engine, the large heat release of the burning pyrophoric fuel is sufficient to ignite the main combustible mixture formed by the air entering the inlet 14 and the hydrocarbon fuel supplied by the nozzles 26.

The piston 32 has a passage 66 with a check valve 68 normally closing said passage. A spring 70 urges the check valve 68 to its closed position and the gas pressure behind the piston 32 also urges the valve 68 to its closed position. The outlet end 34 of the cylinder 28 has a standpipe portion 72 with side openings 71 communicating with the cylinder outlet 34. The arrangement is such that when the piston 32 reaches the end of its stroke, the standpipe 72 lifts the check valve 68 off its seat. The inert gas behind the piston 32 then flows through the piston passage 66 to remove any remaining pyrophoric fuel from the cylindrical space 30 and the outlet conduit 62. Removal of all the pyrophoric fuel from the conduit 62 prevents oxidation of said pyrophoric fuel within this passage 62 with resulting possible clogging of said passage.

During flight operation of the engine 10, as a result of aircraft accelerations large acceleration forces may be imposed on the piston 32 urging the piston against the pyrophoric fuel thereby tending to cause this fuel to leak around the piston to the head end 38 of the cylinder 28. A spring 73 preferably is provided to urge the piston toward the cylinder head end 38 thereby opposing said acceleration forces on the piston and minimizing said fuel leakage.

The conduit 42 between the cylinder 30 and the inert gas container 40 has a pressure regulating valve 74 for maintaining a substantially constant pressure on its downstream side once the diaphragm 44 has been broken to release the gas in the container 40. A solenoid operated valve 76 is provided in the outlet conduit 62 for opening or closing said conduit, said valve having a solenoid winding 78 connected to the previously mentioned electric circuit 60 such that the valve 76 opens when the solenoid winding 78 is energized and closes when the winding is de-energized.

The head end 38 of the cylinder 30 is provided with a safety diaphragm 80. The diaphragm 80 is designed to break should the pressure in the cylinder end 38 become excessive, thereby relieving said pressure. The pyrophoric fuel cylinder 30 with its diaphragm seal 36 in the cylinder outlet fitting 37 constitutes a sealed unitary container structure which can be replaced as a unit either with or without the inert gas pressure bottle 40. This feature is important beacuse of the dangers and difficulties involved in handling pyrophoric fuels.

The solenoid valve 76 and the igniter 54 are automatically controlled by an electric circuit 60 shown in full in Fig. 1 The circuit 60 includes a source of electric energy schematically indicated at 82, a main or manual switch 83, and three serially-connected automatically-controlled switches 84, 86 and 88. Initially, all three of these switches are open and unless otherwise noted the main switch 83 is assumed to be closed. When all three switches 84, 86 and 88 are closed the circuit 60 is closed whereupon the igniter 58 is energized to set off the charge 54 and the solenoid valve 76 is opened whereupon, as previously described, pyrophoric fuel is discharged into the combustion chamber 18 to ignite the main combustible mixture.

The engine 10 is a ramjet engine for aircraft. A rocket (not shown) is frequently used to launch and bring the aircraft up to a flight speed at which the ramjet can provide thrust at which time the rocket may be shed. The switch 84 is intended to close just before the rocket operational phase is completed. For this purpose an insulating strip 90 is arranged to be disposed between the contacts of switch 84 and this strip is automatically removed just prior to the end of the rocket operation. In some cases the rocket is operated for a predetermined period of time in which case suitable timing mechanism 92, having an actuating arm 94, can be provided for withdrawinging the insulating strip against a spring 95 just prior to completion of the rocket operation. Obviously other means responsive to some condition to indicate the approach of the end of rocket operation could be used to withdraw the insulating strip 90. For example the rocket fuel supply or the flight speed could be used to sense the approach of the end of rocket operation for causing withdrawal of the strip 90.

As is conventional, the ramjet fuel pump 22 is rendered effective to deliver the main ramjet fuel under the desired pressure to the ramjet fuel manifold 24 just prior to the end of the rocket operation. The fuel pressure at the manifold 24 is transmitted by a passage 96 to a bellows 98 which in turn is connected to the switch 86 for closing this switch when the pressure of the ramjet main fuel is up to the desired value for ramjet operation. Thus the switch 86 is closed when fuel under the desired pressure is being supplied from the nozzles 26.

If the ramjet burner is extinguished, the pressure in the ramjet combustion chamber is relatively low even though the flight speed is high. Thus when the ramjet has substantial flight velocity and combustion is initiated within the ramjet combustion chamber 18 the pressure within the flow path of the ramjet motive fluid between the inlet 14 and outlet 16 immediately rises substantially. Hence the pressure adjacent the combustion chamber 18 can be used to sense the pressure or absence of combustion of the ramjet main combustible mixture in the chamber 18. For this purpose a flexible diaphragm 100 divides a housing into a pair of chambers 102 and 104. A conduit 106 transmits the static pressure of the surrounding atmosphere to the chamber 102 while a conduit 108 transmits a pressure of the main ramjet fluid at or adjacent to the combustion chamber 18, to the chamber 104. The flexible diaphragm 100 is connected to the switch 88 and a spring 110 acts on the diaphragm to close the switch 88 when the pressure within the chamber 104 is relatively low, that is when the main combustible mixture is not burning in the chamber 18. When the ramjet is operating at substantial flight speed and the main combustion mixture is ignited in the ramjet chamber 18, the pressure transmitted to the diaphragm chamber 104 rises to move the diaphragm to the left (Fig. 1) to open the switch 88.

The aforedescribed armjet ignition control system operates as follows: Before ignition in the ramjet combustion chamber 18 the switch 88 is closed by the spring 110. The switch 86 closes as soon as the pressure of the main ramjet fuel builds up at the manifold 24 to the desired predetermined value, the bellows 98 expanding under the fuel pressure to close the switch 86. Thus the main ramjet fuel is then being discharged from the fuel nozzles 26 for mixture with the ramjet air. The switch 84 closes just prior to the end of the rocket operation. With the three switches 84, 86 and 88 closed, the circuit 60 is completed to the igniter 58. As a result, the gas pressure is released from the container 40 and is applied to the rear side of the piston 32 in the pyrophoric fuel cylinder 28. At the same time that the igniter 58 is energized, the solenoid winding 78 is energized to open the valve 76. Accordingly the gas pressure on the piston 32 is effective to cause the diaphragm 36 to break and to push pyrophoric fuel from the cylinder 28 into the combustion chamber 18 at 64. This charge of pyrophoric fuel ignites spontaneously in the air within the combustion chamber 18 and serves as a pilot flame to ignite the ramjet main combustion mixture at the flameholder 20.

As soon as the ramjet main fuel ignites in the combustion chamber 18, the pressure builds up within the engine whereupon this increased pressure acts on the flexible diaphragm 100 to move said diaphragm against the spring 110 to open the switch 88. This breaks the circuit 60 to de-energize the solenoid winding 78 whereupon the valve 76 closes to shut off the flow of pyrophoric fuel to the engine. As long as the piston 32 in the pyrophoric fuel cylinder 28 has not traveled its complete stroke, gas pressure will continue to be exerted on the rear side of said piston. If the combustion in the chamber 18 should subsequently become extinguished during flight, the pressure within the engine will immediately drop whereupon the switch 88 will again close. The switches 84 and 86 having remained closed, the circuit 60 is again completed whereupon the solenoid valve 76 is again opened and the gas pressure against the piston 32 will again be effective to force another charge of pyrophoric fuel into the combustion chamber 18 where it will again function as a pilot flame. In this way as long as pyrophoric fuel remains in the cylinder 28 the system will automatically operate to reignite the combustible mixture in the combustion chamber 18 should combustion become extinguished.

The system of Figs. 1 and 2 in effect is a multi-shot pyrophoric fuel ignition system. The number of shots of pyrophoric fuel available for ignition being determined by the amount of pyrophoric fuel delivered each ignition cycle as compared to the total quantity of fuel in the cylinder 28 when it is full. Obviously the system of Figs. 1 and 2 could be converted to a single shot system simply by eliminating the solenoid valve 76. The pressure regulating valve 74 may not be necessary particularly in the case of a single shot system. Also particularly in the case of a single shot system the circuit for the igniter may be controlled by a manually operable switch in lieu of the automatically operable switches 84, 86 and 88 described. Such a single shot arrangement is illustrated in Fig. 3. For ease of understanding the parts of Fig. 3 corresponding to parts of Figs. 1 and 2 have been designated by the same reference numerals as said corresponding parts but with a subscript $a$ added thereto. Accordingly no further description of Fig. 3 appears necessary.

Fig. 4 illustrates a further modification where the inert gas container 40 or 40a is eliminated and the gases from a suitable slow burning gas producing powder charge act directly on the pyrophoric fuel cylinder piston. As before, the parts of Fig. 4 corresponding to parts of Figs. 1 and 2 have been designated by the same reference numerals as said corresponding parts but with a subscript $b$ added thereto. In Fig. 4 the head end 38b of the cylinder 28 is closed and a slow burning gas producing powder charge 120 is supported therein. A suitable powder for this purpose comprises a mixture of nitrocellulose, nitroglycerin and a plasticizer. An igniter 122 is provided for setting off said charge 120. Thus in Fig. 4 the gases released from the burning of the charge 120 act directly against the piston 32b. The structure of Fig. 4 is otherwise identical to the corresponding structure of Figs. 1 and 2 or that of Fig. 3. Hence no further description of Fig. 4 is necessary.

In the structure so far described, the movable wall of the pyrophoric cylinder is a slidable piston. Instead of a piston a flexible bellows may be used for this purpose as illustrated in Fig. 5. The parts of Fig. 5 corresponding to the parts of the previous figures have been designated by the same reference numerals but with a subscript $c$. In Fig. 5 a flexible bellows 32c has replaced the pistons of the other modifications. If desired a rupturable disphragm 124 may be disposed across the cylinder 28c between the bellows 32c and the pyrophoric fuel. The diaphragm 124 is designed to break as soon as gas pressure is exerted on the cylinder head side of the bellows to force the pyrophoric fuel from the cylinder 28c. Obviously the gas pressure applied to the bellows 32c may be from a container of gas under pressure as in Figs. 1, 2 and 3 or directly from a powder charge as in Fig. 4. The outlet standpipe 72c in Fig. 5 has a sharp point to rupture the bellows 32c at the end of its stroke whereupon the gas pressure behind the bellows will remove any remaining pyrophoric fuel from the cylinder 28c and its outlet pipe.

Where, as in Figs. 3–5, only a single shot of pyrophoric fuel is obtained from each pyrophoric fuel cylinder a plurality of such cylinders may be connected so that a plurality of shots is available. Such an arrangement is illustrated in Fig. 6.

In Fig. 6 a plurality of pyrophoric cylinders 28d are connected to a common outlet conduit 62d, each through a check valve 130. The outlet conduit 62d terminates in one or more discharge openings through which the pyrophoric fuel is discharged into the ramjet engine. With this arrangement, one of the pyrophoric fuel containers can be used for effecting the initial ignition of the main combustible mixture of the ramjet engine and if the combustion should subsequently become extinguished it may be reignited by using one of the other pyrophoric fuel cylinders. The check valves 130 function to prevent diversion of pyrophoric fuel into any empty cylinder 28d when pyrophoric fuel is being supplied to the engine from another of said cylinders. The pyrophoric cylinders 28d and the particular means for forcing the pyrophoric fuel from the cylinders may be like that shown in any of the arrangements of Figs. 1–5. Also any number of said pyrophoric cylinders may be connected together in the manner of Fig. 6 whereby the ignition cycle may be repeated as many times as there are pyrophoric fuel cylinders.

In Fig. 1, each shot of pyrophoric fuel is introduced into the combustion chamber immediately downstream of the flameholder structure. If desired, each shot of pyrophoric fuel could be discharged directly into a gutter of said flameholder structure. In addition instead of discharging the pyrophoric fuel into a flameholder gutter or immediately downstream of the flameholder each shot of pyrophoric fuel may be discharged into the ramjet fluid flow path upstream of the flameholder structure as shown in Fig. 7. The parts of Fig. 7 corresponding to parts of Fig. 1 have been designated by the same reference numerals as said corresponding parts but with a subscript $e$ added thereto. In Fig. 7 the pyrophoric fuel conduit terminates in an annular ring 132 having a plurality of discharge openings 134 disposed upstream of the flameholder structure 20e. When a shot of pyrophoric fuel is discharged from the ring 132 said fuel immediately ignites and flows downstream to ignite the main combustion mixture at the flameholder structure 20e.

Fig. 8 illustrates a further modification of Fig. 1 in which the pyrophoric fuel is mixed with the hydrocarbon fuel prior to its discharge into the ramjet fluid flow path. The parts of Fig. 8 corresponding to parts of Fig. 1 have been designated by the same reference numerals as said corresponding parts but with a subscript $f$ added thereto. In Fig. 8 the hydrocarbon fuel delivered by the pump 22f is supplied to a manifold or ring 140 having a plurality of openings 142 through which said fuel discharges into the ramjet fluid flow path upstream of the flameholder 20f. A pyrophoric fuel cylinder 28f is connected to an outlet conduit 62f which in turn is also connected to the ring 140 so that the pyrophoric fuel mixes with the hydrocarbon fuel prior to its discharge from the ring opening 142. A check valve 144 is disposed in the conduit 62f to prevent the hydrocarbon fuel from being diverted into an empty pyrophoric fuel cylinder 28f. A shot of pyrophoric fuel, although mixed with hydrocarbon fuel, ignites spontaneously when discharged into the ramjet air stream and therefore, as in Fig. 7, ignites the main combustion mixture at the flameholder structure 20f.

Obviously any of the constructions and/or arrangements of the pyrophoric fuel cylinders and/or the ejecting mechanisms for this fuel illustrated in Figs. 1–6 could be used in the ramjet installations illustrated in Figs. 7 and 8. Furthermore the invention is not limited to ramjet use. Thus the invention can be used for igniting combustion in any air breathing jet engine. Fig. 9 illustrates the invention applied both to the main burner and to the afterburner of a turbojet engine.

In Fig. 9 a turbojet engine is indicated at 150 as comprising a generally duct-like housing 152 within which an air compressor 154 and a turbine 156 are rotatably mounted. The air compressor 154 receives air from an air inlet 158 and delivers compressed air to the combustion chamber 160 where it is mixed and burned with the main fuel supplied from nozzles 162. The combustion gases co-act with the blades of the turbine 156 to drive said turbine which in turn is drivably connected to the compressor 154 by a shaft 164. The gases exhausting from the turbine 156 discharge rearwardly through an exhaust nozzle 166.

As illustrated, the turbojet engine 150 also has an afterburner combustion chamber 168 having flameholder structure 170. The main afterburner fuel is supplied by nozzles 172 for mixture and combustion with the excess oxygen remaining in the combustion gases exhausting from the turbine 156. The turbojet structure so far described is conventional.

For igniting the combustion mixture in the turbojet combustion chamber 160 a pyrophoric ignition mechanism generally indicated at 174 is provided. Said mechanism 174 including an outlet conduit 176 for discharging pyrophoric fuel into the combustion chamber 160 adjacent to its upstream end to provide a pilot flame therein for initiating combustion in this chamber. Similarly for initiating combustion in the afterburner combustion chamber 168, a pyrophoric ignition mechanism generally indicated at 178 is provided. The mechanism 178 includes an outlet conduit 180 for discharging the pyrophoric fuel into the afterburner chamber 168 adjacent to the flameholder structure 170.

The automatic pyrophoric fuel control system of Fig. 1 can be used for controlling the pyrophoric fuel ignition of either the main or afterburners of the turbojet engine 150 except the rocket responsive switch 84 would be eliminated. This is so because a turbojet engine, unlike a ramjet engine, can operate at zero flight speed to provide its own thrust and therefore no take-off rocket is needed with a turbojet. Likewise any of the pyrophoric fuel ignition mechanisms of Figs. 2–8 could be used with either the main or afterburner combustion chambers of the turbojet engine 150 for the pyrophoric fuel mechanisms generally indicated at 174 and 178 respectively.

In all the modifications described, the pyrophoric fuel is pumped by the pressure of a gas behind the fuel, said gas being inert to the fuel. In addition a pump obviously may be provided in the output supply line from the pyrophoric fuel container. Such a pump may provide the entire pumping action in which case the inert gas over the pyrophoric fuel in the pyrophoric fuel container would have a relatively low pressure and would be provided primarily to displace all air from over the pyrophoric fuel in its container.

While we have described our invention in detail in its present preferred embodiment, it will be obvious to those skilled in the art, after understanding our invention, that various changes and modifications may be made therein without departing from the spirit or scope thereof. We aim in the appended claim to cover all such modifications.

We claim as our invention:

In an air breathing jet engine having a combustion chamber to which a main combustible mixture of air and a fuel is supplied therein; the combination therewith of means for igniting said main combustible mixture; said means comprising a container for a pyrophoric fuel, said fuel being capable of igniting spontaneously in air at room tempertures; means including a passageway for supplying said pyrophoric fuel from said container into the flow path of said combustible mixture and igniting said mixture; said last mentioned means comprising a movable wall member for said container and disposed on the side of said pyrophoric fuel remote from said passageway; means causing a gas to exert a pressure against said movable member for moving said wall member to force pyrophoric fuel from said container through said passageway; and means for providing an opening through said movable wall member when said container has been substantially emptied of pyrophoric fuel for causing said gas to purge said passageway of a pyrophoric fuel.

References Cited in the file of this patent

UNITED STATES PATENTS

| | | |
|---|---|---|
| 1,220,103 | Hall | Mar. 20, 1917 |
| 2,402,826 | Lubbock | June 25, 1946 |
| 2,480,147 | Letvin | Aug. 30, 1949 |
| 2,503,472 | Chilowsky | Apr. 11, 1950 |
| 2,505,798 | Skinner | May 2, 1950 |
| 2,631,426 | Jewett | Mar. 17, 1953 |
| 2,648,196 | Mullen | Aug. 11, 1953 |
| 2,658,340 | Cohen | Nov. 10, 1953 |
| 2,667,742 | Kuzmitz | Feb. 2, 1954 |
| 2,671,312 | Roy | Mar. 9, 1954 |
| 2,714,286 | Zucrow | Aug. 2, 1955 |
| 2,715,313 | Fleming et al. | Aug. 16, 1955 |
| 2,741,085 | Prentiss | Apr. 10, 1956 |
| 2,742,758 | Kelly | Apr. 24, 1956 |
| 2,810,257 | Carmody et al. | Oct. 22, 1957 |
| 2,816,419 | Mueller | Dec. 17, 1957 |
| 2,821,838 | Zwicky | Feb. 4, 1958 |

FOREIGN PATENTS

| | | |
|---|---|---|
| 613,181 | Great Britain | Nov. 23, 1948 |
| 660,178 | Great Britain | Oct. 31, 1951 |
| 718,029 | Great Britain | Nov. 10, 1954 |

OTHER REFERENCES

Chemical and Engineering News Magazine, vol. 26, No. 39, Sept. 27, 1948, pp. 2892–2893.